United States Patent [19]

Walker

[11] 4,143,787
[45] Mar. 13, 1979

[54] CAPTIVATED OVER-PRESSURE RELIEF AIR VENT ASSEMBLY

[75] Inventor: Duane H. Walker, Fall Creek, Wis.

[73] Assignee: National Presto Industries, Inc., Eau Claire, Wis.

[21] Appl. No.: 915,823

[22] Filed: Jun. 15, 1978

[51] Int. Cl.² .............................................. B65D 51/16
[52] U.S. Cl. .................................. 220/203; 137/467; 137/533; 220/208
[58] Field of Search ............... 220/202, 203, 206, 208; 137/467, 533

[56] References Cited

U.S. PATENT DOCUMENTS

| | | | |
|---|---|---|---|
| 2,301,724 | 11/1942 | Vischer, Jr. | 220/203 |
| 2,429,149 | 10/1947 | Wittenberg | 220/203 |
| 2,499,828 | 3/1950 | Kuriloff | 220/203 X |
| 2,619,982 | 12/1952 | Turner | 137/467 |
| 2,667,891 | 2/1954 | Hilldale | 292/76 X |
| 2,670,755 | 3/1954 | Kendrick | 137/467 |
| 2,702,046 | 2/1955 | Zimmer et al. | 137/533 X |
| 2,757,685 | 8/1954 | Fritsch | 220/203 X |
| 2,769,457 | 11/1956 | Wittenberg | 220/203 X |
| 3,055,536 | 9/1962 | Dieny | 220/203 |
| 3,858,750 | 1/1975 | Grall | 220/203 |
| 3,973,694 | 8/1976 | Tess | 220/206 |

Primary Examiner—William Price
Assistant Examiner—Allan N. Shoap
Attorney, Agent, or Firm—Merchant, Gould, Smith, Edell, Welter & Schmidt

[57] ABSTRACT

A plug fixed within a provided opening in the wall of a pressure cooker releases therefrom when excessive pressure builds up in the cooker. The plug contains an air vent in which a pressure-actuated closure member operates. The closure member has an outer head which rests on the plug about the air vent when the cooker is in an unpressurized state, a stem which loosely extends through the air vent and an inner head having a shoulder which sealingly engages the underside of the plug about the air vent to close the cooker interior to atmosphere, the inner head also having a larger diametered flange which catches the cooker wall when the plug is ejected from the provided opening in response to excessive pressure build up in the cooker.

15 Claims, 8 Drawing Figures

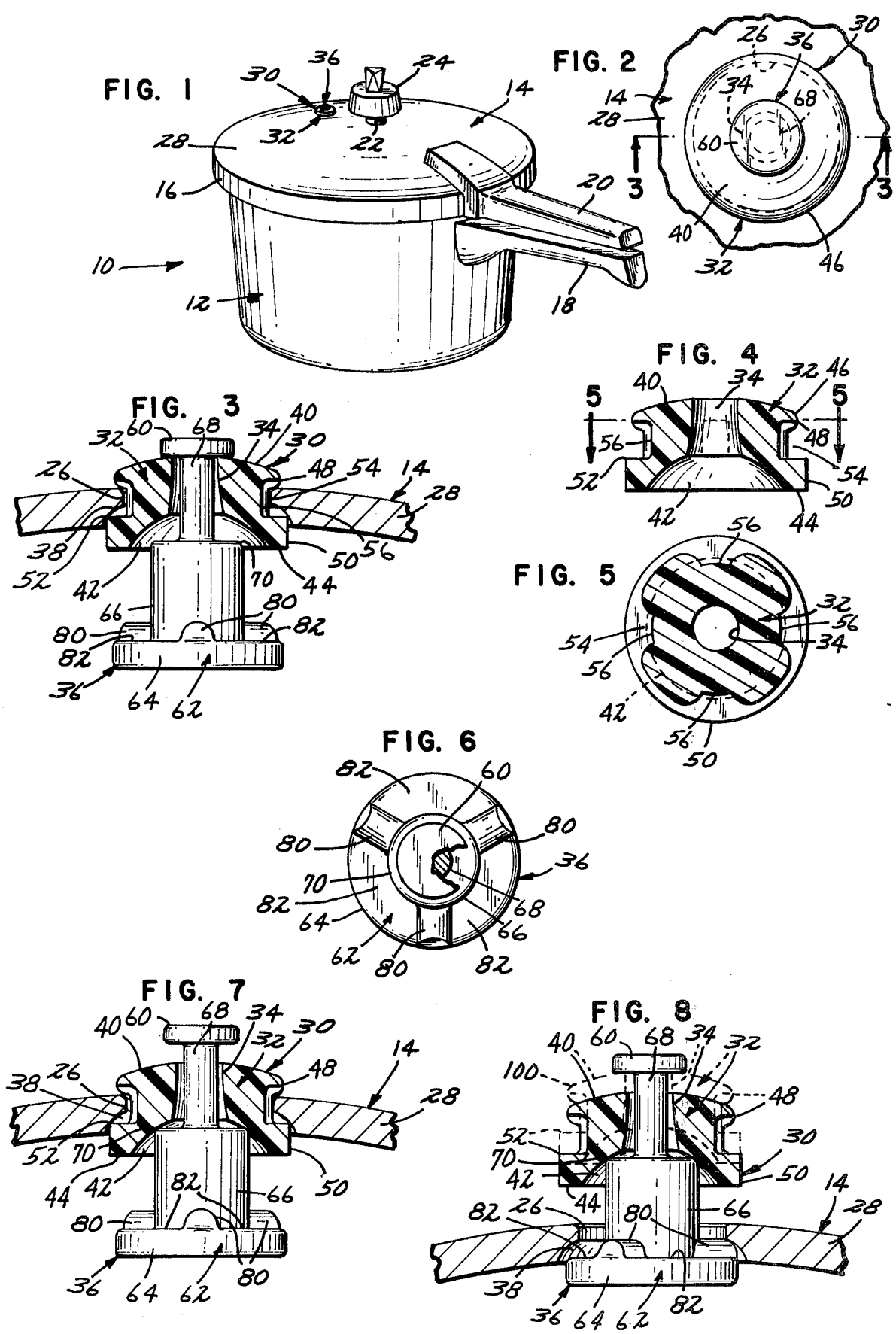

CAPTIVATED OVER-PRESSURE RELIEF AIR VENT ASSEMBLY

This invention relates to pressure cookers such as are utilized in the home to prepare food for the table. More particularly it contemplates a novel and improved construction of over pressure release air vent assembly for such cookers.

Such cookers conventionally consist of a vessel or body having an open top through which water and food to be cooked or jars containing food to be "canned" are loaded. The top is closed by a cover which is releasably sealed fluid-tight to the cooker body and produces a closed chamber in which pressure develops when subjected to heat to effect the cooking or canning process.

Conventionally, the cover of such cookers is provided with a vertical vent pipe on which loosely rests a weight to regulate the pressure developed in the cooker during the cooking act. Such cookers commonly also contain an over pressure release plug, usually in the cover, which is either of a temperature sensitive material which melts and drops into the cooker or is designed so as to be ejected from the cover wall when pressure developing in the cooker approaches an unsafe level.

In Wittenberg U.S. Pat. No. 2,769,457 a combined venting and overpressure release valve comprises an imperforate spool of molded rubber having a central portion which is loosely received within a provided opening in the cooker top wall and has end flanges which lap the opposite sides of the cover wall about the opening. In one embodiment, the central portion of the plug is formed to define a vent passage or passages therebetween and the opening wall which are sealed by the inner flange as pressure develops in the cooker. In a second embodiment, the plug has an axial bore in which a metal valve member moves to close the bore as pressure develops in the cooker. In both embodiments, the inner end flange of the plug yields upon application of excessive pressure and the plug is forcibly ejected from the opening to vent the cooker.

In Zimmer et al. U.S. Pat. No. 2,702,046 a plug is releasably secured in the cover wall opening so as to be ejectable therfrom when pressure in the cooker reaches an unsafe level. The plug has an aperture comprising an upper circular aperture portion which communicates through a shoulder to a lower elliptical-shaped aperture portion. An elongated closure member operating in the aperture has a bifurcated head loosely retained in the circular aperture and a bulged portion in the elliptical aperture portion which rises to engage the shoulder and close the circular aperture portion as pressure develops within the cooker. The movable closure member further has a retaining portion which catches the two shorter sides of the elliptical aperture portion should the bulged portion be forced through the circular aperture portion; and the plug itself is forcibly expelled from the cover wall opening should food or other matter obstruct the aperture in which the closure member operates.

In accordance with the present invention, means are provided which also permit the plug to be forcibly ejected from the cover wall opening when pressure develops to an excessibly high level but captivates the assembly of plug and closure member so that it remains with the cooker while venting the cooker to atmosphere through the opening and about the closure member.

In the presently preferred form of the invention the overpressure plug is of resilient material and fixed within a provided opening in the pressure cooker wall so as to release therefrom should excessive pressure build up in the cooker. The plug has a convexly-rounded outer surface and a concave recessed area in its underside which communicates to atmosphere through a centrally disposed conical shaped air vent in which a pressure-activated closure member operates. The closure member has an outer head which rests on the peripherial edge of the air vent when the cooker is in an unpressurized state and a cylindrically shaped stem which loosely extends through the conical-shaped air vent and is longer than said air vent. It also has an inner head including an annular flange whose diameter is greater than that of the wall opening. It also has a smaller diametered shoulder portion which sealingly engages the underside of the plug about the air vent to close the cooker interior to atmosphere as pressure develops in the cooker.

In use, developing pressure in the cooker acts on the inner head of the closure member causing its outer head to lift off the plug and permit the unsaturated air to vent about the closure member's stem to atmosphere; the shoulder of the inner head sequentially engaging the underside of the plug to close said air vent as the percentage of steam developed in the cooker reaches a predetermined level.

At this point the pressure regulator device on the vent pipe takes over to maintain the cooker at a set pressure level suitable for cooking. Should the vent pipe become clogged or the regulator become inoperative causing the pressure within the cooker to rise to an unsafe level, the plug is ejected from the opening. However, the inner head of the closure member catches the rim of the opening and the assembly remains captivated.

A feature of the invention is that although the shoulder of the closure member's inner head has a diameter greater than the air vent, its diameter is smaller than the wall opening in which the plug is fixed both so that it can enter the concave recessed area in the plug underside to effectively seal the air vent and also so that it can pass through the vacated wall opening with substantial clearance when the plug is ejected.

Another feature is that the shoulder also has an axial length such that the plug when ejected will be well spaced over the cooker wall although the assembly remains captivated to said wall by the larger diametered flange of the closure member's inner head which cannot pass through the opening.

Another feature of the invention is that the flange of said inner head has means such as circumferentially spaced raised radial projections which engage the underside of the cover wall about the opening when the assembly is ejected therefrom so as to vent the cooker interior through the vacated wall opening therebetween and the shoulder portion of the closure member which remains within the opening.

A further feature of the invention is that when the inner flange portion of the ejected plug remains axially centered over the wall opening and in position to deflect the escaping fluids, such as steam, back toward the cooker and not into the room or to the person using the cooker.

Another feature of the invention is that the outer head of the closure member is moved off the plug when the shoulder portion of the closure member closes the air vent and so provides a visual indication that the cooker is in a pressurized state.

Another feature of the invention is the related shape of the closure member and the plug which facilitate both the effective closing of the air vent in the normal operation of the pressure cooker but also facilitates ejection of the plug when the pressure approaches an unsafe level.

Still another feature of the invention is the construction and shape of the plug which facilitates both its initial assembly in the cooker wall opening and its reassembly after being ejected.

Many other features, advantages and/or objects of the invention will be apparent or will become so upon consideration of the preferred embodiment of the invention which now will be described in connection with the figures of the accompanying drawing.

In said drawing:

FIG. 1 illustrates a pressure cooker having an over-pressure release air vent assembly in accordance with the invention in the wall of its cover;

FIG. 2 illustrates in plan, on an enlarged scale, a fragmented portion of the top cover which contains the captivated over-pressure relief air vent assembly comprising the invention;

FIG. 3 is a vertical sectional view thereof taken along lines 3—3 of FIG. 2, the cooker being considered as in an unpressurized state;

FIG. 4 is a sectional view through the plug, the same being shown separate from the closure member and the cover wall opening;

FIG. 5 is a sectional view through the plug taken along lines 5—5 of FIG. 4 looking in the direction indicated by the arrows;

FIG. 6 is a top plan view of the closure member partially fragmented and separate from the plug;

FIG. 7 illustrates the relation of the closure member and the plug when the cooker is being operated in its normal pressurized stae for cooking purposes; and FIG. 8 is a view generally similar to FIG. 7 and illustrating the assembly in its ejected state and captivated to the cooker wall.

Referring now more specifically to the several views wherein like parts are identified by like reference numerals, FIG. 1 illustrates the invention embodied in a pressure cooker of conventional construction, the cooker being identified generally at 10. The illustrated pressure cooker 10 comprises a generally cylindrical cooker body or vessel 12 having an open top which is closed fluid tight by a removable circular-shaped cover 14 having a peripherally disposed depnding cylindrical flange 16 which surrounds the top edge of the cooker body. Cooker body 12 has a generally horizontally projecting handle 18 fixed to the body wall and the cover 14 has a similarly projecting handle 20 affixed thereto, the two handles being illustrated in an aligned relation, one over the other, in which position the cover is sealed fluid tight to the cooker body. The manner of sealing the cover to the cooker body comprises no part of the present invention. However, as an example, cover flange 16 may be provided with a plurality of circumferentially spaced inwardly directed lug portions. With handles 18, 20 out of alignment, these lugs can be passed between correspondingly spaced lug portions fixed about the top edge of the cooker body. Assembly is completed by then rotating the cover on through an angle sufficient to force the cover lug portions beneath the cooker body lugs. In this position indicated by the aligned handles, the cover and its supported gasket (not shown) are drawn against the top edge of the cooker-body wall to effect the fluid-tight seal which permits pressure to be developed within the cooker when heated. Such a structure is disclosed in co-pending application for U.S. Pat. Ser. No. 824,421 owned by assignee, now U.S. Pat. No. 4,103,801 issued Aug. 1, 1978, to which reference may be had for a better understanding thereof.

Disposed centrally of the cover and establishing communication with the interior of the cooker 10 is a vent pipe 22 on which rests a weighted regulator device 24, said device functioning in the cooking process to maintain a set pressure within the cooker, as is conventional.

This invention is particularly concerned with the novel over-pressure release air vent assembly illustrated at 30 in FIGS. 1 and 3 which serves as an auxiliary to the pressure regulating device 24. First, it acts in conjunction with the pressure regulating device as an automatic air-vent which vents the unsaturated air out of the cooker at the start of the cooking process and closes when the percentage of saturated steam in the cooker reaches a predetermined level. Secondly, it acts as a visual indicator which signals when the cooker is in a pressurized state, for example, of at least the aforementioned 1.0 lb. p.s.i. Thirdly, it acts as an over-pressure protection device which vents the cooker to atmosphere should the vent pipe 22 and/or its pressure regulator 24 become obstructed in some manner as by clogging with food which would permit pressure inside the cooker to build up above the pressure which the pressure regulating device 24 is set to maintain.

Referring now to FIG. 3, in its presently preferred form, assembly 30 comprises a grommet or lug 32 of a resilient material such as rubber having a continuous recess about its periphery which is dimensioned to snugly receive the surrounding edge of a provided opening 26 in the cooker cover wall 28, the plug containing a centrally disposed conical-shaped air vent or aperture 34 in which is removably located a spool valve or closure member 36. Preferrably, opening 26 is circular and/or cylindrical in shape and extends partially through the cover wall thickness and opens into a generally concave rounded annular recess 38 which is centered on the longitudinal axis of said aperture 34.

Considering also FIGS. 4 and 5 with FIG. 3, plug 32 has a convexly rounded outer surface 40 and a concave rounded annular cavity 42 on it underside surrounded by an essentially planar annular outer surface 44. As illustrated by FIG. 4, plug 32 has an outer annular flange portion 46 with a continuous rounded edge 48 whose outside diameter is greater than that of opening 26, a larger-diametered inner radial flange 50 with squared upper and lower edges 52 and an intermediately disposed continuous recess 54 having an I.D. approximating the diameter of opening 26. Recess 54 has an axial dimension only slightly greater than the axial length of opening 26, the edge of which it receives, wherefore upper flange 46 overlyingly engages the upper surface of the cover walls 28 about opening 26 and lower flange 50 of the plug has an upper edge 52 in continous line bearing contact with the rounded surface of the communicating annular concave recess 38 on the underside of the cover wall 28. In the base of reces 54 and extending into the underside of the upper flange 46 are circumferentially spaced grooves 56 which facilitate temporary flexing of flange 42 when forcing the plug through opening 26 in assemblying the unit 30 in the cover wall.

Considering now FIG. 6 with FIG. 3, closure member 36 which is recipically mounted in the air vent or aperture 34 has an outer head 60 provided with a flat underside which has continous contact with the outer rim or edge of the air-vent 34. Said closure member 36, also has an inner head 62 provided with an annular flange 64 and a shoulder 66 integrally connected to the outer head 60 by a connecting stem 68. Closure member 36 thus comprises a rigid one-piece of aluminum or other metal. As illustrated in portion 68 it is generally cylindrical in shape, having a length greater than that of the air vent or aperture 34, and a cross-section substantially smaller than that of the aperture 34 wherefore it is loosely mount through the aperture and the closure member is free to move axially within the limits enforced by the outer head 60 and shoulder portion 66. As illustrated in FIG. 3, shoulder portion 66 has a diameter greater than that of the air vent or aperture 34 of the plug 32 but smaller than that of the opening 26 through the cooker wall 28 which receives plug 32. Its diameter is also less than the O.D. of the rounded concavital recess 42 on the other side of the plug 32. Thus, the shoulder 66 is capable of entering recess 42 as the developing pressure in the cooker acts on the closure member causing its upper edge 70 to establish continous line contact with the rounded surface of recess 42 to close the air vent 34.

Comparing now FIG. 7 with FIG. 3, as heat is applied to the cooker, the developing pressure acts on the inner head 62 of the closure member, causing the closure member to rise and lift its outer head 60 off the outer side of the plug whereby the interior of the cooker is vented to atmosphere which allows the unsaturated air to escape past shoulder rim 70 and about stem 68 until developing pressure is sufficiently great that the closure member has been raised to a height where rim 70 finaly engages the cavital surface 42 of the lug to effect a fluid tight seal which closes the air vent 34. This condition is indicated by the raised level of the outer head 60 as illustrated in FIG. 7. Simultaneously, the pressure brought to bear by the rim 70 of the shoulder 66 on said cavital surface 42 also causes edge or rim 52 of lower flange 50 to resiliently bear against the concavital surface 38 of the cover wall 28 about opening 26 to complete the fluid tight seal of the cover. Thereafter, with continued application of heat to the cooker, the pressure develops to a preset level which is then maintained by the regulator 24 as is conventional.

In the event vent pipe 22 should clog with food, or for any reason become obstructed and the regulator 24 unable to exercise its intended control over the developing pressure in the cooker, the pressure could rise in the cooker to an unsafe level. However, in accordance with this invention, inner flange 50 of plug 32 will yield to pressure developed in the cooker in excess of the normal cooking pressure and thereby allow the plug 32 to be ejected from opening 26.

A feature of the invention is that cavital surface 42 of the plug extends to approximately the level of the upper surface of the lower flange 50 and the O.D. of said cavital surface 42 at its junction with annular surface 44 substantially coincides with the I.D. of recess 4. The result is a narrow portion or neck provided at 78 which facilitates flexing of said lower flange 50 in response to the developing pressure and thereby the forceful ejection of the plug from the wall opening 26 before the cooker pressure reaches an unsafe level. However, flange portion 64 of the closure member's inner head 62 has a diameter greater than that of the opening 26 in the cover wall so that although the plug 32 is ejected from the opening 26, it carries the closure member 36 with it and because flange 64 cannot pass through the wall opening it catches in cavity 38 thereby the assembly including plug 32 remains captivated to the cover 14.

As illustrated by FIG. 8, shoulder portion 66 of the closure member has a diameter substantially smaller than the diameter of opening 26 in the cooker cover wall and the annular flange portion 64 thereabout is provided with three equally spaced radially directed ridges 80 (FIG. 6) which actually engage the underside of the cover wall in the concavity 42 about the opening 26 so as to create spaces 82 between said ridges 80 which provide for relatively large venting to atmosphere through opening 26 about the shoulder portion 66 which continues to protrude through the opening 26. As illustrated in said FIG. 8, shoulder 66 has an axial length at least as great as that of the stem 68 and is several time the thickness of opening 26 wherefore the plug completely clears the cover wall and vacates opening 26. The plug, however, remains in an aligned spaced relation over the opening 26 so that fluids are free to vent through the opening and the underside of the plug is in position to direct the escaping fluids back toward the cooker cover rather than into the surrounding enviroment. As illustrated by phantom lines 100 in said FIG. 8, the pressure of the exiting fluids may be sufficient to initially force the plug 32 off its seat on the rim 70 of shoulder 66 of the closure member. However the plug member remains connected to the closure member, being caught by upper head 60. Thereafter, unless the plug has been damaged, the assembly 30 may be cleaned and the plug reinserted in opening 26 by deflecting lower flange 50 inwardly and forcing it through the opening.

From the aforesaid description of the preferred embodiment, it will be appreciated that all of the recited features of the invention can be realized in a simple uncomplicated structure consisting of a rigid movably mounted closure member and a resilient air vent defining member which components are both easy to manufacture and assemble as well as effective in operation.

Thus having described the invention what is claimed is:

1. A captivated over-pressure release air vent assembly for a pressure cooker comprising a plug fixable in a provided opening in the pressure cooker wall so as to release therefrom when excessive pressure builds up in the cooker, said plug containing an air vent and a closure member movable in said air vent having an outer head of a diameter greater than that of the air vent, an inner head having a diameter greater than that of the cooker wall opening, and a connecting stem including a first portion extending through the air vent, said first stem portion being located adjacent the outer head of the closure member and having both a diameter less than that of the air vent and a length greater than that of the air vent, said closure member including a shoulder portion between the first stem portion and its inner head, said shoulder portion having a diameter less than that of the cooker body opening and greater than that of the air vent, the outer head of the closure member engaging the outer side of the plug when the cooker is in an unpressurized state, the closure member reacting in response to pressure developed in the cooker to move its shoulder portion into sealing engagement with the plug to close the air vent, and the inner head of the closure member having means for engaging the underside of the cooker wall when excess pressure develops in the cooker sufficient to release the plug from said opening, said engaging means of the closure member inner head being spaced from the plug engagement portion of the shoulder portion for venting the cooker to atmosphere through the cooker wall opening when engaged with the underside of the cooker wall to relieve the overpressurized state of the cooker.

2. A captivated over-pressure release air vent assembly as claimed in claim 1 wherein the outer head of the closure member is located clear of the plug when the shoulder portion of the closure member engages the underside of the plug to indicate the pressurized state of the cooker.

3. A captivated over-pressure release air vent assembly as claimed in claim 1 wherein the underside of the plug remains aligned with the cooker wall opening when the plug is released therefrom to deflect fluid escaping from the opening back toward the cooker wall containing the assembly.

4. A captivated over-pressure release air vent assembly as claimed in claim 1 wherein the underside of the plug has a rounded concavity centered on the axis of the air vent whose diameter is less than that of the cooker wall opening, the shoulder portion of the closure member stem establishing continuous edge contact with said concavity about the air vent to close the air vent as pressure develops in the cooker.

5. A captivated air pressure release air vent assembly as claimed in claim 1 wherein the means on the inner head of the closure member which vent the cooker to atmosphere embody circumferentially spaced ridges which engage the underside of the cooker wall to leave spaces therebetween about the shoulder portion which protrudes through the opening.

6. A captivated air pressure release air vent assembly as claimed in claim 5 wherein the distance separating the engagement of the inner head and it ridges with the underside of the plug is greater than the cooker wall thickness.

7. A captivated over-pressure release air vent assembly for mounting in a provided opening in the wall of a pressure cooker, said assembly comprising a plug of resilient material having a central axially-extending air vent therethrough and surrounding inner and outer radial flange portions of diameters greater than that of the cooker wall opening, said flange portions being axially spaced to resiliently engage and catch with opposite sides of the wall of the cooker about said opening to releasably secure the plug therein; and a closure member extending through said air vent having an outer head, an inner head, and an intermediate connecting stem therebetween, said stem including a first stem portion adjacent the outer head having a diameter less than and an axial length greater than the corresponding dimensions of the air vent, said closure member having a second stem portion adjoining said first stem portion having a diameter greater than that of the air-vent but less than that of the cooker wall opening, said second stem portion providing a shoulder about said first stem portion between which and the outer head movement of the closure member in the air vent is confined;

said closure member reacting in response to development of pressure in the cooker to sealingly engage its shoulder against the underside of the plug about the air vent, its outer head being located off the plug to signal the pressurized condition of the cooker;

the inner head of the closure member being spaced from said shoulder and having a diameter greater than that of the second stem portion and of the cooker wall opening such that said inner head engages the underside of the cooker wall about its opening when pressure develops in the cooker sufficient to release the plug from the opening;

said inner head having circumferentially spaced ridges which engage the underside of the cooker wall and provide an exit through the spaces therebetween for fluids to escape to atmosphere about the second stem portion of the spool valve member, and reduce the over-pressurized state of the cooker;

the inner radial flange portion of the plug remaining aligned over the cooker wall opening to deflect said escaping fluid back toward the cooker.

8. A captivated over-pressure release air vent assembly as claimed in claim 7 wherein the underside of the plug has a rounded concavity centered with the axis of the air vent, the width of said concavity being less than that of the lower flange to leave a surrounding flat annular portion, said concavity having an axial dimension approximately the thickness of the inner flange portion of the plug.

9. A captivated over-pressure release air vent assembly as claimed in claim 8 wherein the shoulder portion of the closure member is received within said concavity and has continuous lineal contact therewith approximately at the level of the upper surface of said inner flange portion.

10. A captivated over-pressure release air vent assembly as claimed in claim 9 wherein the outerside of the plug intermediate its flange portions and the underside of its outer flange portion have circumferentially spaced recesses.

11. A captivated over pressure release air vent assembly as claimed in claim 9 wherein the provided opening communicates with a rounded concavity centered therewith on the underside of the cooker wall, the inner flange portion of the plug being recieved in said concavity and having continuous line contact therewith approximately at the level of the contact of the shoulder portion of the closure member with the concavity in the underside of the plug.

12. A captivated over-pressure release air vent assembly as claimed in claim 8 wherein the outer side of the plug is convexshaped.

13. A captivated over-pressure release air vent assembly as claimed in claim 8 wherein the air vent is conical in shape and the first stem portion of the closure member is cylindrical.

14. In combination, a pressure cooker having a wall, a vent pipe fixed in said wall, having a pressurizing regulator mounted thereon to maintain the cooker at a set cooking pressure and an over-pressure plug fixed within an opening in said wall so as to be ejected therefrom by pressure developed in the cooker which exceeds that for which the regulator is set, said over pressure plug containing an aperture and a plunger including a stem extending through said aperture having an outer head which overlies the outer side of the overpressure plug and an inner head having a shoulder portion to engage the underside of the plug about the aperture, said outer head and shoulder portion being spaced apart a distance greater than the axial length of the aperture, said plunger reacting to pressure developed in the cooker to lift the outer head off the plug when the cooker is in a pressurized state, and the inner head of the plunger having spaced abutment portions which engage the underside of the cooker wall about the opening when the overpressure plug is ejected from the opening so as to retain the plug and its plunger captivated by the cooker, said inner head providing exits between the abutments for fluids to escape from the cooker through the vacated opening to reduce the developing pressure in the cooker.

15. The combination of claim 14 wherein the plug, when ejected from the opening is retained by the plunger, in a spaced aligned relation over the vacated opening to deflect the escaping fluids back toward the cooker wall.

* * * * *

UNITED STATES PATENT AND TRADEMARK OFFICE
CERTIFICATE OF CORRECTION

PATENT NO. : 4,143,787
DATED : March 13, 1979
INVENTOR(S) : Duane H. Walker

It is certified that error appears in the above-identified patent and that said Letters Patent are hereby corrected as shown below:

Column 1, line 46, "therfrom" should be --therefrom--.

Column 3, line 40, "stae" should be --state--.
Column 3, line 52, "depnding" should be --depending--.

Column 4, line 35, "lug 32" should be --plug 32--.
Column 4, line 65, "reces" should be --recess--.

Column 5, line 39, "lug" should be --plug--.
Column 5, line 64, "recess 4" should be --recess 54--.

Signed and Sealed this

Twenty-fourth Day of July 1979

[SEAL]

Attest:

Attesting Officer

LUTRELLE F. PARKER
Acting Commissioner of Patents and Trademarks